United States Patent
King, III

[11] 3,803,648
[45] Apr. 16, 1974

[54] VERSATILE CAMPING TOOL
[76] Inventor: Thomas C. King, III, 630 W. Maplehurst, Ferndale, Mich. 48220
[22] Filed: Apr. 19, 1972
[21] Appl. No.: 245,502

[52] U.S. Cl.............................. 7/13 B, 145/108 R
[51] Int. Cl................................................ B25f 1/02
[58] Field of Search....... 7/1 F, 1 L, 12, 13 R, 13 B, 7/14.55; 145/108 R, 33 R, 33 A, 33 E; 294/49, 51

[56] References Cited
UNITED STATES PATENTS

| | | | |
|---|---|---|---|
| 1,568,484 | 1/1926 | Tolman | 294/49 |
| 1,229,667 | 6/1917 | Stimecz | 7/14.55 |
| 3,339,602 | 9/1967 | Wilson | 145/33 E |
| 645,348 | 3/1900 | Colognati | 7/14.55 |

FOREIGN PATENTS OR APPLICATIONS

| | | | |
|---|---|---|---|
| 304,831 | 4/1918 | Germany | 294/49 |
| 397,462 | 5/1909 | France | 294/51 |

Primary Examiner—James L. Jones, Jr.
Assistant Examiner—Mark S. Bicks
Attorney, Agent, or Firm—Rose & Edell

[57] ABSTRACT

A versatile camping tool can be used as a saw, shovel, pick or snow anchor. The tool includes a tubular bent handle, a saw blade which is removably secured to opposite ends of the handle, and a shovel head adapted to be removably secured to either end of the handle. The saw blade can be stored inside the handle. The shovel head is adapted to be used with a handle made of bush timber found at the camp site.

1 Claim, 6 Drawing Figures

PATENTED APR 16 1974 3,803,648
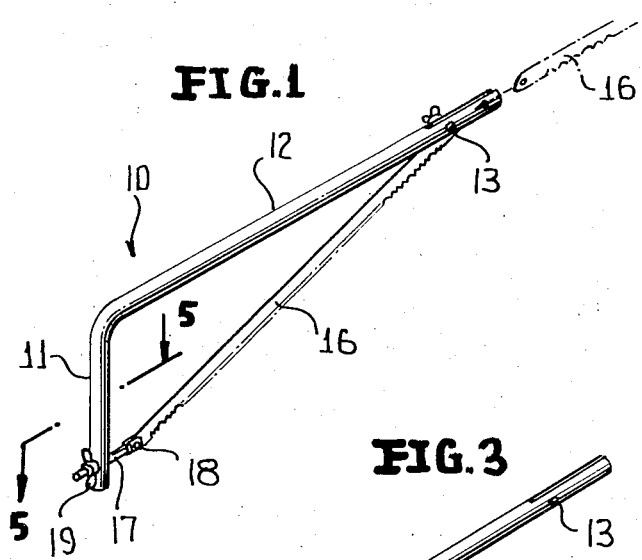
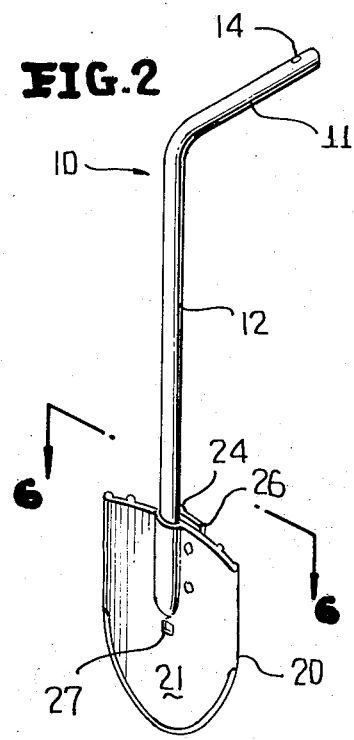
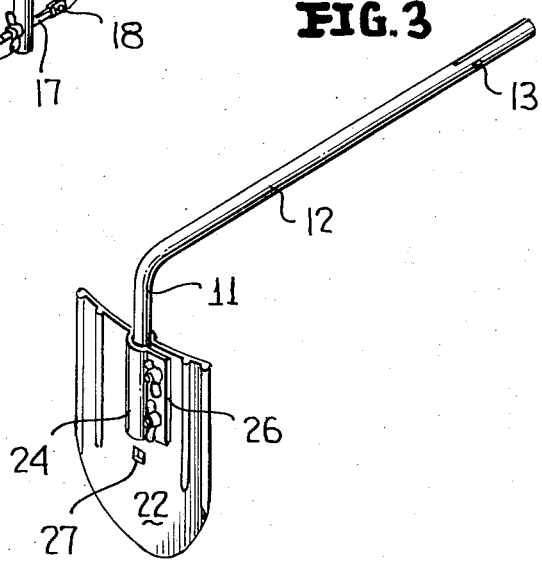
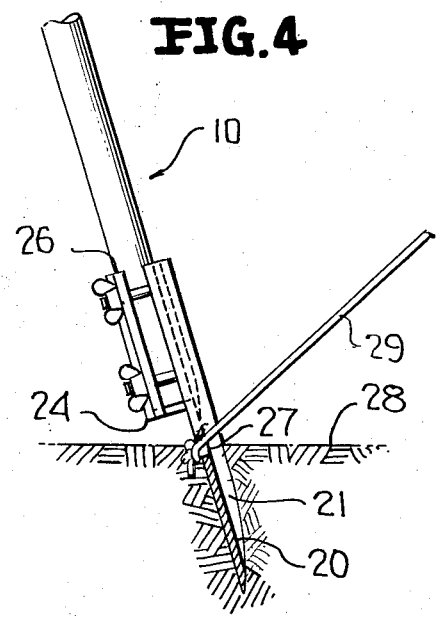
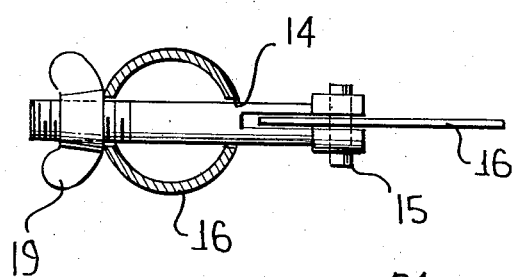
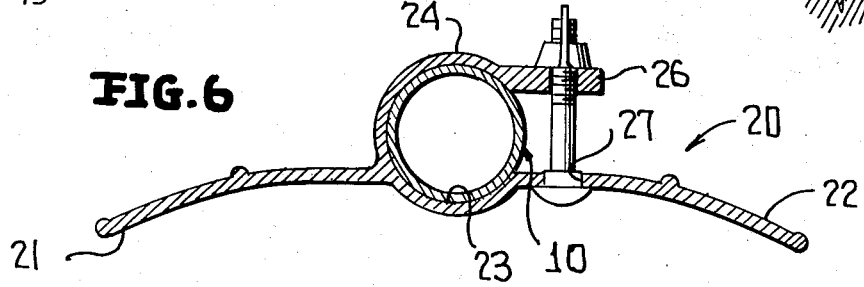

VERSATILE CAMPING TOOL

BACKGROUND OF THE INVENTION

The present invention relates to combination tools and, more particularly, to a combination saw and shovel as would be utilized by campers.

Two of the most valuable camping tools are the saw and the shovel. In the prior art these tools have been separate, resulting in a heavy, bulky load to be carried by a camper.

It is an object of the present invention to provide a combination shovel and saw, suitable for use in camping, which can be easily carried and stored in a minimum of space.

SUMMARY OF THE INVENTION

According to the present invention, a tool includes a tubular handle having a right angle bend, a saw blade adapted to be removably secured between the ends of the handle, and a shovel head adapted to be removably secured to either end of the handle. The handle is hollow to permit storage of the saw blade therein when not in use. The shovel head serves as a pick when secured to the shorter leg of the handle, and as a shovel when secured to the longer leg of the handle. The shovel head itself is unique in that it can also be secured to a piece of wood found at camp, thereby rendering the handle unnecessary.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein:

FIG. 1 is a view in perspective of the tool of the present invention employed as a saw;

FIG. 2 is a view in perspective of the tool of the present invention employed as a shovel;

FIG. 3 is a view in perspective of the tool of the present invention employed as a pick;

FIG. 4 is a view in perspective of the tool of the present invention employed as a snow anchor;

FIG. 5 is a view in partial section taken along lines 5—5 of FIG. 1; and

FIG. 6 is a view in plan of the shovel head of the present invention.

DESCRIPTION OF THE PREFERRED EMBODIMENTS

Referring to the accompanying drawings in detail, a handle 10 comprises a tubular member bent at a right angle to form a short leg 11 and a long leg 12. The bend may be a sharply defined right angle, as shown, or may be bent in an arc. Further, a true right angle bend is not absolutely necessary according to the principles of the present invention. To minimize weight yet provide sufficient strength, handle 10 is preferably made from aluminum; however, the particular material employed is not to be construed as limiting the scope of the invention. A hole 13 is defined through handle 10 proximate the end of long leg 12, and is of such size as to receive a screw or bolt or the like. Hole 13 extends perpendicular to the plane of handle 10. A second hole 14 is defined through the handle proximate the end of short leg 11 and is adapted to receive a tensioning stud 17 described in detail below. Hole 14 extends perpendicular to leg 11 in the plane of handle 10.

As best illustrated in FIG. 1, a hack saw blade 16 may be removably secured to handle 10 between holes 13 and 14. Specifically, blade 16 has a hole at one end which is adapted to be aligned with hole 13 in the long leg 12 of handle 10. The handle and blade are secured together via these holes by means of a threaded bolt and wing nut combination, or by a screw which threadedly engages hole 13, or by similar means. The other end of blade 16 is also provided with a hole, the latter being permanently engaged by tensioning stud 17 which is removably secured to the short leg 11 of the handle at hole 14. The tensioning stud, as best illustrated in FIG. 5, is threaded at one end and bifurcated at the other. The bifurcated end pivotally engages the end of blade 16 by means of a rivet or pin 15. The threaded end of tensioning stud 17 extends through hole 14 whereupon it is engaged by a wing nut 19 or the like. The blade tension is adjustable by simply tightening or loosening wing nut 19.

The width of blade 16 is sufficiently small to permit it to be stored in long leg 12 of the tubular handle when the blade is not in use. To remove the blade from its in-use position, wing nut 19 is removed and the screw or bolt at hole 13 is likewise removed. The blade 16, with stud 17 attached, is then stored inside the handle.

Also part of the tool is a shovel head 20 adapted to be secured to either end of handle 10. Shovel head 20 has a generally spade-like configuration, converging toward its bottom and having a front surface 21 which is concave about its top-to-bottom longitudinal axis. A recessed channel 23 of arcuate cross-section runs lengthwise along the center of rear surface 22. As best illustrated in FIG. 6, a flange 24, which is preferably formed integral with shovel head 20, extends part-way along channel 23 and has an arcuate cross-section configuration which is a continuation of the arc defined by channel 23. The combined arcs formed by the cross-sections of channel 23 and flange 24 form somewhat more than one-half a circle. The end of the flange 24 is defined by a lip 26 having a pair of holes formed therein, said holes being aligned with respective holes defined through shovel head 20 and located adjacent channel 23. The space between flange 24 and channel 23 is thus adapted to receive a generally cylindrical member, such as either leg of handle 10. The handle, when inserted between flange 24 and channel 23, can be secured in that location by means of screw and wing nut combinations, or the like, the screws extending through respective aligned hole pairs in flange lip 24 and the shovel head. A stop, in the form of a raised portion or termination of channel 23, may be provided to limit the length in channel 23 along which a leg of handle 10 may extend. In this manner the stop serves to permit proper positioning of the handle in channel 23.

To utilize the tool of the present invention as a shovel, shovel head 20 may be secured to the end of long leg 12 of handle 10, as illustrated in FIG. 2. Alternatively, a piece of bush timber, or the like, found at the camp site and having a suitable cross-section, may be secured to the shovel head between flange 24 and channel 23. The shovel head itself, therefore, is a useful camping tool.

To utilize the tool as a pick, shovel head 20 is secured to the end of short leg 11 as illustrated in FIG. 3.

The tool of the present invention has additional camping utility as a snow anchor. As illustrated in FIG. 4, with shovel head 20 secured to either leg of handle 10, or to a piece of bush timber, the bottom of the shovel head may be set into the snow 28. A tent guy line 29 may be inserted through a suitably provided hole 27 in the shovel head and knotted, as shown. The shovel head provides significantly large resistance to the tension on line 29 and thereby provides secure anchoring for a tent.

Variations in configuration of the tool are to be considered within the province of the present invention. For example, handle 10 may have a rectangular or other cross-sectional configuration, as long as the space between flange 24 and channel 23 is configured accordingly.

While I have described and illustrated specific embodiments of my invention, it will be clear that variations of the details of construction which are specifically illustrated and described may be resorted to without departing from the true spirit and scope of the invention as defined in the appended claims.

I claim:
1. A multi-purpose camping tool, comprising:

a one-piece tubular member having a substantially right angle bend defining a long handle leg and a short handle leg, at least one of said legs being hollow and open at its end remote from said bend, the end of each handle leg remote from said bend being configured to serve as a handle for said tool;

an elongated saw blade having first and second ends, said saw blade being of sufficiently small length, width and thickness to be inserted through the open end of said one handle leg and be enclosed by that handle leg for storage purposes;

mounting means for removably securing said first end of said saw blade to said long handle leg and simultaneously removably securing said second end of said saw blade to said short handle leg, said mounting means being located on said handle legs such that said saw blade subtends an acute angle with both handle legs when said saw blade is simultaneously secured to both handle legs;

a shovel head having a channel formed thereon of such size to receive the ends of both said handle legs one at a time;

means for removably securing said shovel head to a handle leg end received by said channel; and means for securing a rope under tension to said shovel head;

wherein said tool serves as a saw when said saw blade is secured to both handle legs simultaneously, as a shovel when said shovel head is secured to the end of said long handle leg, as a pick when said shovel head is secured to said short handle leg, and as a tent anchor when the shovel head is partially embedded in the terrain and a rope under tension is secured thereto and to a tent.

* * * * *